United States Patent
Böhner et al.

(10) Patent No.: US 9,272,645 B2
(45) Date of Patent: Mar. 1, 2016

(54) ADJUSTING APPARATUS FOR A PIVOTABLE COMFORT ELEMENT, IN PARTICULAR FOR AN ARMREST OF A VEHICLE

(71) Applicant: AUDI AG, Ingolstadt (DE)

(72) Inventors: Jan Böhner, Ingolstadt (DE); Heinz Lang, Grossmehring (DE); Markus Schulze, Abensberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/390,532

(22) PCT Filed: Jan. 17, 2013

(86) PCT No.: PCT/EP2013/000117
§ 371 (c)(1),
(2) Date: Oct. 3, 2014

(87) PCT Pub. No.: WO2013/149691
PCT Pub. Date: Oct. 10, 2013

(65) Prior Publication Data
US 2015/0091318 A1    Apr. 2, 2015

(30) Foreign Application Priority Data
Apr. 3, 2012    (DE) .......................... 10 2012 006 773

(51) Int. Cl.
*B60J 9/00*    (2006.01)
*B60N 2/46*    (2006.01)

(52) U.S. Cl.
CPC .................................. *B60N 2/4633* (2013.01)

(58) Field of Classification Search
CPC .................. Y10T 292/1047; Y10T 292/1082; Y10T 70/5226; E05B 59/00; E05B 3/143; A47C 1/03; B60N 2/4633; B60N 2/4646; B60N 2/4606; B64D 11/06

USPC ............. 296/1.09, 153, 37.8; 297/115, 411.2, 297/411.32, 411.35, 411.36, 411.37, 297/411.38; 248/118.3, 118

See application file for complete search history.

(56) References Cited

U.S. PATENT DOCUMENTS

| 1,929,471 | A | * | 10/1933 | Bank ....................... A47C 7/441 297/301.4 |
| 3,950,027 | A | * | 4/1976 | Wilson .................... A47C 7/543 108/142 |

(Continued)

FOREIGN PATENT DOCUMENTS

| DE | 199 15 469 A1 | 10/2000 |
| DE | 10 2006 048 107 A1 | 4/2008 |
| DE | 10 2009 057 536 A1 | 3/2011 |

OTHER PUBLICATIONS

International Search Report issued by the European Patent Office in International Application PCT/EP2013/000117.

*Primary Examiner* — Kiran B Patel
(74) *Attorney, Agent, or Firm* — Henry M. Feiereisen LLC

(57) ABSTRACT

An adjusting apparatus for a comfort element swingable in relation to a support structure, in particular for an armrest of a vehicle, includes a latching device actuatable by adjusting the comfort element and having a latching arm connected to the comfort element and a latching lever interacting with the latching arm. A swing position of the comfort element is locked by providing a locking lever which is swingably articulated to the latching arm and has an engagement portion which locks the swing position by a spring force, when the engagement portion assumes an engagement position with a locking portion of a locking element that is fixed to the support structure, and the swing position of the comfort element is unlocked by an actuator by which the locking lever is disengageable from the engagement position with the locking element.

11 Claims, 3 Drawing Sheets

(56) References Cited

U.S. PATENT DOCUMENTS

| | | | | |
|---|---|---|---|---|
| 4,165,901 A * | 8/1979 | Swenson | B60N 2/38 | 297/411.33 |
| 4,176,878 A * | 12/1979 | Koutsky | B60N 2/4606 | 297/115 |
| 4,244,623 A * | 1/1981 | Hall | A47C 1/03 | 297/115 |
| 4,307,913 A * | 12/1981 | Spiegelhoff | A47C 1/03 | 297/115 |
| 4,496,190 A * | 1/1985 | Barley | B60N 2/4633 | 297/411.32 |
| 4,657,305 A * | 4/1987 | Meiller | B60N 2/464 | 297/115 |
| 4,674,790 A * | 6/1987 | Johnson | B60N 2/4626 | 248/118 |
| 4,828,323 A * | 5/1989 | Brodersen | B60N 2/4633 | 248/118 |
| 4,881,424 A * | 11/1989 | Clark | B60N 2/468 | 297/411.36 |
| 4,881,778 A * | 11/1989 | Stephenson | B60N 2/4606 | 297/411.32 |
| 5,265,938 A * | 11/1993 | Melhuish | A47C 1/03 | 297/411.36 |
| 5,409,297 A * | 4/1995 | De Filippo | B60N 2/4613 | 16/332 |
| 5,558,404 A * | 9/1996 | Muzzy | B60N 2/4626 | 297/411.38 |
| 5,597,209 A * | 1/1997 | Bart | B60N 2/4633 | 246/411.32 |
| 5,647,638 A * | 7/1997 | Ritt | A47C 1/03 | 248/118.3 |
| 5,984,416 A * | 11/1999 | Waldo | A47C 1/03 | 297/411.32 |
| 6,296,312 B1 * | 10/2001 | Congleton | A47C 1/03 | 297/411.35 |
| 6,467,847 B2 * | 10/2002 | Bidare | B60N 2/4633 | 297/411.3 |
| 7,011,371 B1 * | 3/2006 | Tsai | A47C 1/03 | 297/353 |
| 7,185,952 B1 * | 3/2007 | Chen | B60N 2/4633 | 297/411.38 |
| 7,581,791 B2 * | 9/2009 | Diffrient | A47C 1/03 | 297/115 |
| 8,702,174 B2 * | 4/2014 | Pacolt | B60N 2/4633 | 297/411.38 |
| 8,950,816 B2 * | 2/2015 | Ott | B60N 2/4606 | 297/411.32 |
| 9,115,521 B2 * | 8/2015 | Nuss | B60N 2/4633 | |
| 2007/0241603 A1 * | 10/2007 | Otto | B60N 2/4445 | 297/411.38 |
| 2009/0026826 A1 * | 1/2009 | Cebula | B60N 2/4633 | 297/411.32 |
| 2009/0284034 A1 * | 11/2009 | Nuss | B60N 2/4606 | 296/1.07 |
| 2014/0054946 A1 * | 2/2014 | Pichler-Wilhelm | B60N 2/466 | 297/411.2 |
| 2014/0183923 A1 * | 7/2014 | Itzinger | B64D 11/06 | 297/411.38 |
| 2015/0001909 A1 * | 1/2015 | Lorey | B60N 2/02 | 297/411.36 |

\* cited by examiner

ADJUSTING APPARATUS FOR A PIVOTABLE COMFORT ELEMENT, IN PARTICULAR FOR AN ARMREST OF A VEHICLE

CROSS-REFERENCES TO RELATED APPLICATIONS

This application is the U.S. National Stage of International Application No. PCT/EP2013/000117, filed Jan. 17, 2013, which designated the United States and has been published as International Publication No. WO 2013/149691 and which claims the priority of German Patent Application, Serial No. 10 2012 006 773.9, filed Apr. 3, 2012, pursuant to 35 U.S.C. 119(a)-(d).

BACKGROUND OF THE INVENTION

The invention relates to an adjusting apparatus for a comfort element which is swingable in relation to a support structure, in particular for an armrest of a vehicle.

A generic adjusting apparatus for adjustment of a swingable armrest or arm support is known, for example, from DE 10 2006 048 107 A1. This apparatus includes a latching device which includes a first latching element connected to a swingable armrest and having a toothing, and a second latching element which also has a toothing. The second latching element is held swingably under the influence of a spring force in an engagement position with the toothing of the first latching element. The profiles of both toothings are hereby configured to permit the armrest to swing open in the manner of a ratchet, while a swinging back is, however, supported by the toothings.

Such armrests may also be configured for longitudinal adjustment, as known e.g. from DE 199 15 469 A1 and additionally equipped with a storage space underneath the pivotable armrest.

In order to meet the motor vehicle safety standard (FMVSS 201) of the National Highway Traffic Safety Administration (NHTSA) in terms of height-adjustable and length-adjustable armrests, the latter must be additionally locked when cantilevered or in the presence of a subjacent storage option.

The afore-mentioned known adjusting apparatuses for armrests of a motor vehicle fail to meet this condition, i.e. the armrest may carry out an uncontrolled pivoting motion, when accelerated accordingly in the event of an accident, so that objects, stowed in a storage space underneath the armrest may fly around in the interior of the vehicle and therefore pose a significant risk of injury to vehicle occupants.

Object of the invention is therefore to refine an adjusting apparatus of the afore-mentioned type such that an uncontrolled upward swinging of a comfort element, in particular an armrest of a vehicle, is reliably prevented and the armrest has a simple structure.

SUMMARY OF THE INVENTION

This object is attained in accordance with the invention by an adjusting apparatus for a comfort element swingable in relation to a support structure, in particular for an armrest of a vehicle, including a latching device which is actuated by adjustment of the comfort element and interacts with a latching lever connected to the comfort element, and providing a locking lever which has an engagement portion and is swingably articulated to the latching arm for locking a swing position of the comfort element and which locks under the influence of a spring force the swing position in an engagement position of the engagement portion with a locking portion of a locking element fixed to the support structure, and by providing for unlocking the swing position of the comfort element an actuator by which the locking lever can be disengaged from the engagement position with the locking element.

According to the invention, there is only need for a locking lever and a locking element to lock each swing position of the comfort element, in particular of an armrest. Locking is realized by the locking lever which is held in an engagement position with the locking element under the influence of a spring force. When the comfort element swings open, in particular when an armrest swings open, the locking mechanism according to the invention is not visible, but only the actuator.

The comfort element, in particular of the armrest, can swing open only when the actuator is actuated so that the locking lever swings out or disengages from the engagement position with the locking element. After conclusion of an actuation of the actuator, the locking lever because it is spring-biased swings back into a locking position in correspondence with the actual swing position of the comfort element or the armrest. Thus, pivoting of the comfort element, in particular a height adjustment of the armrest, is rendered impossible, absent an actuation of the actuator, so that a storage compartment arranged underneath the armrest is not opened when the armrest swings open uncontrollably, for example due to high accelerations.

It is particularly advantageous according to a configuration of the invention, when the locking lever and the locking element are configured such that each engagement position of the locking lever with the locking element correlates with a latching position of the latching device. As a result, locking is only possible insofar as the comfort element is swingable or as an armrest can be swung open. Preferably, the locking lever and the locking element are configured for this purpose with a number of engagement positions corresponding to the number of latching positions. As a result, the structural configuration of the adjusting apparatus can be kept simple:

According to a further configuration of the invention, the engagement portion of the locking lever and the locking portion of the locking element are each formed with a segment toothing. Preferably, the segment toothing of the locking lever is formed with only one locking tooth and the segment toothing of the locking portion is formed with a number of segment teeth in correspondence with the number of latching positions of the latching device. Such segment toothings result in a high level of reliability, i.e. a reliable interlocking of the participating engagement and locking portions is ensured at any time.

It is particularly advantageous in accordance with a configuration of the invention, when the profile of the locking tooth of the locking lever and the profile of the segment teeth of the locking element are configured such that the comfort element is blocked from swinging open, but a return swing movement is possible. As a result, an armrest can be swung downwards into the lowermost swing position at any time.

According to a further configuration of the invention, the latching device is formed by providing the latching arm with a latching toothing, and by providing the latching lever, articulated to the support structure and configured as ratchet lever, with an engagement profile which engages in the latching toothing under the influence of a spring force. Preferably, the profile of the latching toothing and the engagement profile of the locking lever are formed such that the comfort lever can swing open in the presence of a latched engagement and disengaged locking lever, but a return swing movement of the comfort element is supported.

It is particularly advantageous according to a refinement of the invention, to provide the actuator with a Bowden cable for unlocking the swing position of the comfort element. Preferably, the actuator is formed with an actuation button such that the actuation path of the actuation button is converted by a deflection kinematics into a rotational movement of a telescopic rod of the comfort element, whose rotational movement is transformed by a further deflection kinematics into a pulling motion of the Bowden cable. Such a telescopic rod for transmitting the button actuation allows the comfort element, i.e. in particular an armrest, to be adjustable in length.

BRIEF DESCRIPTION OF THE DRAWING

The invention will be described hereinafter in greater detail by way of an exemplary embodiment with reference to the accompanying figures. It is shown in.

DETAILED DESCRIPTION OF PREFERRED EMBODIMENTS

Figure 1:
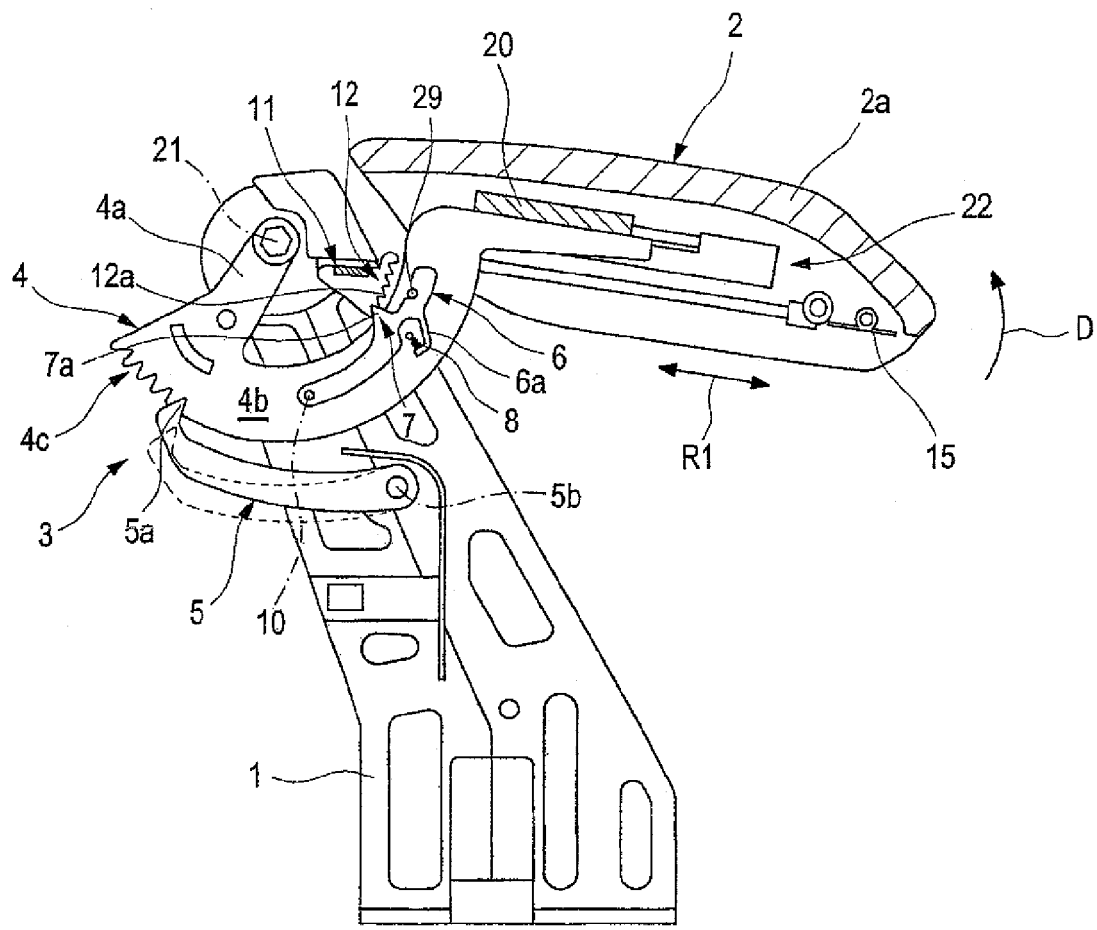
FIG. 1 a side view of an adjusting apparatus for a swingable armrest of a motor vehicle, having incorporated therein a locking mechanism and an actuating mechanism and an actuation mechanism, FIG. 2 an enlarged perspective detailed view of the actuation actuating mechanism and the locking mechanism of the adjusting apparatus according to FIG. 1, and FIG. 3 a perspective view of the actuating mechanism of operably connected to the locking mechanism of the adjusting apparatus according to FIG. 1.

As shown in FIG. 1, an armrest 2 as a comfort element has an arm support 2a which is formed as a center armrest for the front seats of a vehicle, in particular a motor vehicle. Located underneath the armrest 2 is a storage compartment (not shown in FIG. 1) which is closed by the armrest 2.

The armrest 2 includes, according to FIGS. 1 and 2, a carrier plate 20 on which both the arm support 2a and a length adjusting kinematics 22 for longitudinal adjustment of the arm support 2a are arranged in accordance with the double arrow R1, with a further description of the length adjusting kinematics 22 being omitted hereinafter.

Figure 2:
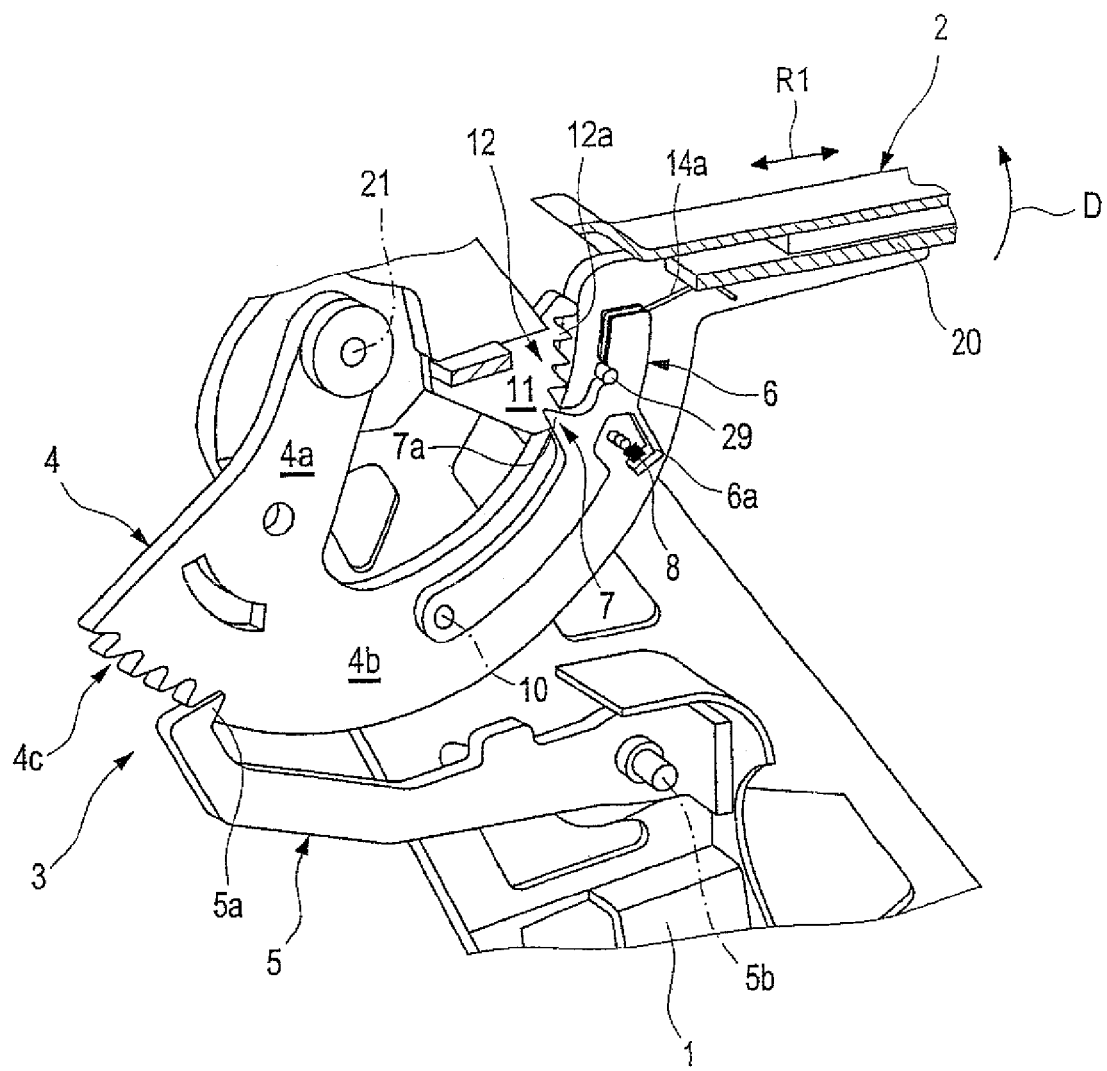

According to FIG. 2, the carrier plate 20 is swingably connected to a support structure 1 via two latching arms 4 which are attached in parallel and have each a rotary lever 4a and a circular portion 4b which connects this rotary lever 4a with the carrier plate 20. The rotary levers 41 have pivot axes 21 which are received by the support structure 1 and about which both these latching arms 4 are swingably mounted, respectively, so that the armrest 2 can be pivoted in a pivoting direction D from an initial position in accordance with the illustrations in FIGS. 1 and 2, so that the storage compartment (not shown), located underneath the armrest 2, is opened and accessible by a vehicle occupant.

A latching device 3 is provided for swinging the armrest 2 from the initial position and includes a latching toothing 4c, arranged on an end face of the latching lever 4 in a radial direction of its rotary lever 4a, and a latching lever 5 with an engagement profile 5a configured as latching tooth. The latching lever 5 engages via the latching tooth 5a into the latching toothing 4c, with the number of the tooth gaps of the latching toothing 4c determining the number of swing positions of the armrest 2 and thereby also its angle of inclination.

The latching lever 5 is swingably articulated about a rotation axis 5b on the support structure 1 and is held by a spring element (not shown) in an engagement position with the latching toothing 4c, so that the latching tooth 5a engages one of the tooth gaps of the latching toothing 4c of the latching arm 4.

The profiles of the latching toothing 4c and the latching tooth 5a are configured such that the latching lever 5 swings with the latching tooth 5a in a ratchet-like manner out of the latching toothing 4c, as the armrest 2 swings open, and engages again a tooth gap in accordance with the incremental adjustment determined by the tooth width of the latching toothing.

As each swing position assumed by the armrest 2 is locked by a locking mechanism 30 (FIG. 3) having a locking lever 6 and a locking element 11, the armrest 2 can be swung open only after unlocking the swing position, e.g. from the lowermost position shown in FIGS. 1 and 2.

Figure 3:
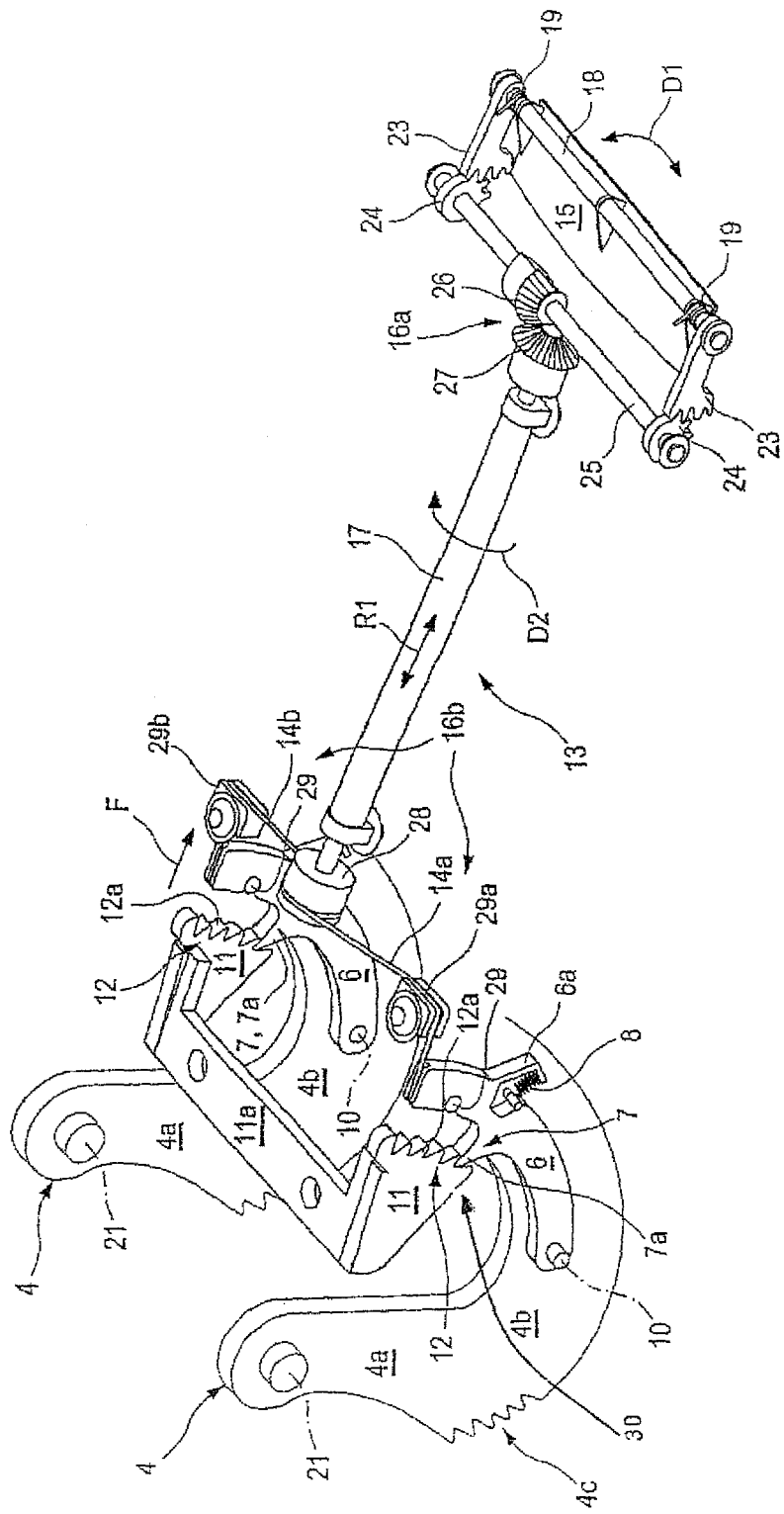

As shown in particular from FIG. 3, each locking lever 6 is swingably mounted about a rotation axis 10 on both latching arms 4, that is on the circular portion 4b thereof, and conforms to the arch-shaped course of this portion 4b. Each of these locking levers 6 engages via an engagement portion 7, configured as segment toothing, in a locking portion 12 which is also configured as segment toothing and which is part of a locking element 11 connected to the support structure 1, and is urged by a return spring 8, attached to a retention arm 6a of the locking lever 6, in this engagement position against the locking element 11.

The two locking elements 11 with their locking portion 12, configured as segment toothing, are connected to one another according to FIG. 3 by a web-like connection plate 11a and mounted via this connection plate 11a to the support structure 1.

The segment toothing 7 of the locking lever 6 is configured as a locking tooth 7a and engages one of the tooth gaps, formed by the segment teeth 12a of the segment toothing 12 of the locking element 11, for locking a swing position of the armrest 2, when the latching lever 5 of the latching device 4 also engages via its latching tooth 5a in one of the tooth gaps of the latching toothing 4c of the latching arm 4. Thus, the two locking levers 6 and the associated locking elements 11 are configured such that the engagement positions of the locking levers 6, when the respective locking tooth 5a engages the segment toothing 12 of the locking element 11, correspond to the latching positions defined by the latching lever 5 and the latching toothing 4c.

The profiles of the locking tooth 7a of the locking lever 6 and the segment toothing 12 of locking elements 11 are shaped such that in the engagement position of the locking lever 6, the armrest 2 cannot swing open, however a downward movement is permitted.

This ensures that in the presence of high accelerations, the armrest 2 cannot swing open in an uncontrolled manner and objects in a storage compartment (not shown in the figures) arranged underneath the armrest 2 can therefore not fall out.

Unlocking of a swing position of the armrest 2 requires therefore a disengagement of both locking levers 6 from their respective engagement position, so that their locking tooth 7 is no longer in engagement with the segment toothing 12 of the locking elements 11. For this purpose, the adjusting apparatus according to the invention includes an actuator 13 which effects a disengagement of the locking levers 6 from their respective engagement position by actuating an actuation button 15.

The structure and mode of operation of this actuator 13 will be explained hereinafter with reference to FIG. 3.

The wing-like actuation button 15 has a rotary shaft 18 mounted at the forward end of the armrest 2 in transverse relation to the pivoting direction D and has ends which are each provided with a return spring 19 to urge the actuation button 15 in its idle position.

Actuation of the actuation button 15 translates its pivot movement D1 via a deflection kinematics 16a into a rotation movement D2 of the telescopic rod 17. This deflection kinematics 16a includes tooth segments 23 arranged at the ends of the rotary shaft 18 for engagement in tooth segments 24 at the ends of a further rotary shaft 25, with the further rotary shaft 25 extending in parallel relation to the rotary shaft 18. A bevel gear mechanism of the deflection kinematics 16a includes a bevel gear 26 disposed on the rotary shaft 25, and a bevel gear 27 mounted to an end of the telescopic rod 17, so that the rotation movement transmitted from the tooth segments 23 via the tooth segments 24 to the rotary shaft 25 is transmitted to the telescopic rod 17. The length adjustment of the arm support 2a is also accompanied by an extension or shortening of the length of the telescopic rod 17 in the direction of the double arrow R1 in the absence of any interference with the rotation movement.

The rotation movement D2 of the telescopic rod 17, as initiated by actuating the actuation button 15, is converted by a further deflection kinematics 16b into a pulling motion F of a Bowden cable 14a and 14b onto the two locking levers 6, so that their disengagement from their engagement position with the respective locking element 11 is effected.

This deflection kinematics 16b includes a Bowden cable roller 28 which is arranged at an end of the telescopic rod 17 and from which a Bowden cable 14a is connected via a deflection roller 29a with the one locking lever 6 and a further Bowden cable 14b is connected via a further deflection roller 29b with the other locking lever 6. The two Bowden cables 14a and 14b extend from the Bowden cable roller 28 perpendicular to the telescopic rod 17 and are then deflected by the deflection rollers 29a and 29b into the pivot plane of the two locking levers 6. The end of a Bowden cable 14a and 14b is guided at the end of the locking lever 6 distal to the rotary shaft by a terminal groove, so that a pin 29 forming the end of the Bowden cable 14a and 14b is mounted in a provided receptacle of the locking lever 6.

As mentioned above, the armrest 2 can swing open only when the actuation button 15 is actuated to disengage the two locking levers 6 from their engagement position with the locking element 11. Once the actuation button 15 is no longer actuated, after the armrest 2 has swung open, the return spring 8 causes the two locking levers 6 to engage their engagement position with the locking element 11 in the respective swing position. A further height adjustment is not possible without actuating the actuation button 15. Further, the swing position of the armrest 2 is locked only in the pivot range defined by the latching device 3.

The profiles of the locking tooth 7a of the locking lever 7 and the segment toothing 12 of the locking element 11 are configured such that a downward pivoting from a swing position of the armrest 2 as predefined by the latching device 3 into the lowermost swing position is possible in the manner of a ratchet, when the latching device 3 is brought at the same time to a state in which the latching lever 5 has disengaged from the latching toothing 4c. This kinematics is not shown in FIGS. 1 and 2, but known in the art.

Such a kinematics enables to swing the armrest 2 for backward pivoting first up to the greatest pivot angle to thereby disengage the latching lever 5 from the latching toothing 4c and thus to enable the armrest 2 to be swung back to its initial position.

An additional control kinematics (not shown in the figures) enables the locking lever 6 to move from its engagement position with the locking element 11 in order to avoid ratchet noises, when the armrest 2 is pivoted downwards.

The use of a telescopic rod 17 to transmit the unlocking motion of the actuation button 15 permits a length-adjustment of the armrest 2. The entire adjusting apparatus according to the invention for locking the swing positions of the armrest 2 can be realized in a space-saving manner, without any corresponding components being visible from outside for an operator.

The adjusting apparatus according to the invention for an armrest, which at the same time also provides a cover for a subjacent storage compartment, meets the required motor vehicle safety standard (FMVSS 201) of the National Highway Traffic Safety Administration (NHTSA) in the U.S., according to which height-adjustable and length-adjustable armrests must be locked.

A further advantage of the adjusting apparatus according to the invention is that the corresponding locking mechanism is invisible for a vehicle occupant so that therefore the visual appearance of the armrest is not impaired.

REFERENCE SIGNS 1 support structure
2 comfort element, armrest
2a arm support of armrest 2
3 latching device
4 latching arm of the latching device 3
4a rotary lever of the latching arm 4
4b circular portion of the latching arm 4
4c latching toothing of the latching arm 4
5 latching lever of the latching device
5a engagement profile, latching tooth of the latching lever 5
5b rotary shaft of the latching lever 5
6 locking lever
6a retention arm of the locking lever 6
7 engagement portion, segment toothing of the locking lever 6
7a locking tooth of the locking lever 6
8 return spring
9 axis of rotation of the locking lever 6
10 locking element
11a connection plate of the locking elements 11
11 locking portion, segment toothing of the locking element
12a segment tooth of the segment toothing
12 actuator
14a Bowden cable of the actuator
14b Bowden cable of the actuator
15 actuation button.
16a deflection kinematics
16b deflection kinematics
17 telescopic rod
18 rotary shaft
19 return spring
20 carrier plate of the armrest 2
21 pivot axis
22 length adjustment kinematics of the armrest 2
23 tooth segment
24 tooth segment
25 rotary shaft
26 bevel gear
27 bevel gear
28 Bowden cable roller
29 pin of the Bowden cable 14a, 14b

What is claimed:

1. An adjusting apparatus for a comfort element, comprising:
   a latching device actuated when the comfort element is adjusted, said latching device having a latching arm connected to the comfort element, and a latching lever interacting with the latching arm;
   a locking mechanism configured to lock a swing position of the comfort element, said locking mechanism including a locking element fixed to a support structure and having a locking portion, and a spring-biased locking lever which is swingably articulated to the latching arm and has an engagement portion configured to lock the swing position, when the engagement portion assumes an engagement position with the locking portion of the locking element; and
   an actuator configured to unlock the swing position of the comfort element by disengaging the locking lever from the engagement position with the locking element.

2. The adjusting apparatus of claim 1, wherein the comfort element is an armrest of a vehicle.

3. The adjusting apparatus of claim 1, wherein the locking lever and the locking element are configured such that the engagement position of the locking lever with the locking element correlates with a latching position of the latching device.

4. The adjusting apparatus of claim 1, wherein the locking portion of the locking element has a segment toothing configured to define a number of engagement positions in correspondence with a number of latching positions defined by a segment toothing of the latching device.

5. The adjusting apparatus of claim 1, wherein the engagement portion of the locking lever and the locking portion of the locking element are each formed with a segment toothing.

6. The adjusting apparatus of claim 5, wherein the segment toothing of the locking lever has a locking tooth, said segment toothing of the locking portion being configured with a number of segment teeth in correspondence with a number of latching positions of the latching device.

7. The adjusting apparatus of claim 6, wherein the locking tooth of the locking lever has a profile and the segment teeth of the locking element have a profile, said profile of the locking tooth and said profile of the segment teeth being configured to inhibit the comfort element from swinging open and to permit a swinging back motion thereof.

8. The adjusting apparatus of claim 1, wherein the latching arm of the latching device has a latching toothing and the latching lever of the latching device is articulated to the support structure and has an engagement profile which engages in the latching toothing.

9. The adjusting apparatus of claim 8, wherein the latching toothing of the latching arm and the engagement profile of the latching lever are configured such that the comfort element is able to swing open and a swinging back motion of the comfort element is supported, when the latching lever engages the latching arm and the locking lever is disengaged from the locking element.

10. The adjusting apparatus of claim 1, wherein the actuator comprises a Bowden cable.

11. The adjusting apparatus of claim 10, wherein the actuator comprises an actuation button movable along an actuation path, a telescopic rod, a first deflection kinematics disposed between the actuator and the telescopic arm to convert a movement of the actuation button along the actuation path into a rotational movement of the telescopic rod, and a second deflection kinematics configured to convert the rotational movement of the telescopic rod into pulling motion of the Bowden cable.

* * * * *